United States Patent

Itkin et al.

(10) Patent No.: US 10,318,312 B2
(45) Date of Patent: Jun. 11, 2019

(54) SUPPORT OF OPTION-ROM IN SOCKET-DIRECT NETWORK ADAPTERS

(71) Applicant: Mellanox Technologies, Ltd., Yokneam (IL)

(72) Inventors: Yuval Itkin, Zoran (IL); Liran Liss, Atzmon (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/717,969

(22) Filed: Sep. 28, 2017

(65) Prior Publication Data

US 2019/0095222 A1    Mar. 28, 2019

(51) Int. Cl.
| | |
|---|---|
| *G06F 13/36* | (2006.01) |
| *G06F 9/4401* | (2018.01) |
| *G06F 13/40* | (2006.01) |
| *G06F 13/42* | (2006.01) |

(52) U.S. Cl.
CPC .......... *G06F 9/4411* (2013.01); *G06F 9/4408* (2013.01); *G06F 13/4027* (2013.01); *G06F 13/4282* (2013.01); *G06F 2213/0026* (2013.01)

(58) Field of Classification Search
CPC .. G06F 9/4411; G06F 9/4408; G06F 13/4282; G06F 13/4027; G06F 2213/0026
See application file for complete search history.

(56) References Cited

U.S. PATENT DOCUMENTS

| | | | | |
|---|---|---|---|---|
| 2005/0216715 | A1* | 9/2005 | Matheny | G06F 9/4416 713/1 |
| 2013/0086371 | A1* | 4/2013 | Bisht | G06F 9/4403 713/2 |
| 2015/0172112 | A1 | 6/2015 | Itkin et al. | |
| 2015/0215343 | A1* | 7/2015 | Itkin | H04L 41/04 709/217 |
| 2016/0127197 | A1* | 5/2016 | Yethadka | H04L 41/12 709/224 |
| 2016/0248619 | A1 | 8/2016 | Itkin | |

(Continued)

OTHER PUBLICATIONS

PCI Express® Base Specification, Revision 3.1, 1073 pages, Mar. 2014.

(Continued)

*Primary Examiner* — Jing-Yih Shyu
(74) *Attorney, Agent, or Firm* — Kligler & Associates

(57) ABSTRACT

A network adapter includes one or more network ports, multiple bus interfaces, and a processor. The one or more network ports are configured to communicate with a communication network. The multiple bus interfaces are configured to communicate with multiple respective Central Processing Units (CPUs) that belong to a multi-CPU device. The processor is configured to support an Option-ROM functionality, in which the network adapter holds Option-ROM program instructions that are loadable and executable by the multi-CPU device during a boot process, and, in response to a request from the multi-CPU device to report the support of the Option-ROM functionality, to report the support of the Option-ROM functionality over only a single bus interface, selected from among the multiple bus interfaces connecting the network adapter to the multi-CPU device.

12 Claims, 2 Drawing Sheets

(56) References Cited

U.S. PATENT DOCUMENTS

2016/0248620 A1    8/2016    Itkin

OTHER PUBLICATIONS

DMTF—"Management Component Transport Protocol (MCTP) Base Specification", DMTF Document DSP0236, version 1.3.0, 94 pages, Nov. 24, 2016.

DMTF—"Management Component Transport Protocol (MCTP) PCIe VDM 25 Transport Binding Specification," DMTF Document DSP0238, version 1.0.1, 19 pages, Dec. 11, 2009.

DMTF—"NC-SI over MCTP Binding Specification", DMTF Document DSP0261, version 1.1.0, 31 pages, Mar. 21, 2015.

DMTF—"Management Component Transport Protocol (MCTP) SMBus/I2C Transport Binding Specification", DMTF Document DSP0237, version 1.0.0., 42 pages, Jul. 28, 2009.

Intel Corporation., "Preboot Execution Environment (PXE) Specification", version 2.1, 103 pages, Sep. 20, 1999.

DMTF—"Server Management Command Line Protocol (SM CLP) Specification", DMTF Document DSP0214, version 1.0.2, 164 pages, Mar. 7, 2007.

Itkin et al., U.S. Appl. No. 15/701,461, filed Sep. 12, 2017.

Unified Extensible Firmware Interface Specification, version 2.6, Chapter 3 (pp. 69-92), Jan. 2006.

Unified Extensible Firmware Interface Specification, version 2.6, Chapter 6 (pp. 127-232), Jan. 2006.

Unified Extensible Firmware Interface Specification, version 2.6, Chapter 10 (pp. 367-454), Jan. 2006.

Unified Extensible Firmware Interface Specification, version 2.6, Chapter 13 (pp. 687-788), Jan. 2006.

* cited by examiner

SUPPORT OF OPTION-ROM IN SOCKET-DIRECT NETWORK ADAPTERS

FIELD OF THE INVENTION

The present invention relates generally to network communication, and particularly to methods and systems for supporting Option-Read-Only-Memory (Option-ROM).

BACKGROUND OF THE INVENTION

Servers and computers in general perform a predefined bootstrapping ("boot") process upon power-up. In a typical boot process, the computer's Built-In Operating System (BIOS) initializes the various peripherals of the computer, e.g., network adapter, graphics processor and disks. Some computer peripherals support "Option-ROM"—program code, typically stored in on-board non-volatile memory, which is called and executed by the BIOS. Option-ROM is also sometimes referred to as "Expansion ROM." One example use-case of Option-ROM is network-boot Option-ROM, which is stored in a network adapter and enables the BIOS to load the computer's operating system over a network from a remote location.

Various standardized protocols are used for controlling boot processes. One example protocol is the Unified Extensible Firmware Interface (UEFI) protocol, which is specified, for example, in "Unified Extensible Firmware Interface Specification," version 2.6, January, 2006.

Another example protocol is Preboot eXecution Environment (PXE), which is a client-server environment that boots a software assembly, retrieved from a network, on PXE-enabled clients. PXE is specified, for example, by Intel Corp., in "Preboot Execution Environment (PXE) Specification," version 2.1, Sep. 20, 1999, which is incorporated herein by reference.

Yet another example is the Server Management Command Line Protocol (SM CLP), which is specified by the Distributed Management Task Force (DMTF), in "Server Management Command Line Protocol (SM CLP) Specification," Document DSP0214, version 1.0.2, Mar. 7, 2007, which is incorporated herein by reference.

SUMMARY OF THE INVENTION

An embodiment of the present invention that is described herein provides a network adapter including one or more network ports, multiple bus interfaces, and a processor. The one or more network ports are configured to communicate with a communication network. The multiple bus interfaces are configured to communicate with multiple respective Central Processing Units (CPUs) that belong to a multi-CPU device. The processor is configured to support an Option-ROM functionality, in which the network adapter holds Option-ROM program instructions that are loadable and executable by the multi-CPU device during a boot process, and, in response to a request from the multi-CPU device to report the support of the Option-ROM functionality, to report the support of the Option-ROM functionality over only a single bus interface, selected from among the multiple bus interfaces connecting the network adapter to the multi-CPU device.

In some embodiments, the processor is configured to refrain from reporting the support of the Option-ROM functionality over one or more of the bus interfaces in response to the request, even though the one or more of the bus interfaces support the Option-ROM functionality.

In an embodiment, by reporting the support of the Option-ROM functionality over only the single bus interface, the processor is configured to cause the multi-CPU device to present to a user only a single, non-redundant set of one or more configuration menus for configuring the network adapter.

In an example embodiment, the multiple bus interfaces are configured to communicate with the multi-CPU device over a Peripheral Component Interconnect Express (PCIe) bus. In a disclosed embodiment, the multi-CPU device includes a multi-CPU server.

In some embodiments, the Option-ROM program instructions, when loaded and executed, check which of the multiple bus interfaces reports the support of the Option ROM functionality, and enable the Option ROM functionality to the multi-CPU device only over the single bus interface.

There is additionally provided, in accordance with an embodiment of the present invention, a method including, in a network adapter, communicating with a communication network via one or more ports, and communicating via multiple bus interfaces with multiple respective Central Processing Units (CPUs) that belong to a multi-CPU device. An Option-ROM functionality is supported in the network adapter, by holding in the network adapter Option-ROM program instructions that are loadable and executable by the multi-CPU device during a boot process. In response to receiving in the network adapter a request from the multi-CPU device to report the support of the Option-ROM functionality, the support of the Option-ROM functionality is reported over only a single bus interface, selected from among the multiple bus interfaces connecting the network adapter to the multi-CPU device.

There is further provided, in accordance with an embodiment of the present invention, a computer software product, the product including a tangible non-transitory computer-readable medium in which program instructions are stored, which instructions, when read by a processor of a network adapter, cause the processor to communicate with a communication network via one or more ports, to communicate via multiple bus interfaces with multiple respective Central Processing Units (CPUs) that belong to a multi-CPU device, to support an Option-ROM functionality by holding in the network adapter Option-ROM program instructions that are loadable and executable by the multi-CPU device during a boot process, and, in response to receiving from the multi-CPU device a request to report the support of the Option-ROM functionality, to report the support of the Option-ROM functionality over only a single bus interface, selected from among the multiple bus interfaces connecting the network adapter to the multi-CPU device.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for supporting Option-ROM in multi-CPU servers. In some embodiments, a network adapter is used for connecting a multi-CPU server to a communication network. In particular, the network adapter is configured to communicate with two or more of the CPUs of the server directly, e.g., over direct respective PCIe links. The network adapter supports an Option-ROM functionality, i.e., holds Option-ROM program instructions that can be loaded and executed by the BIOS of the multi-CPU device during the boot process.

The capability to communicate directly between the network adapter and multiple individual CPUs is advantageous with regards to communication performance. For managing the support of Option-ROM, however, this capability can be problematic. For example, the boot process typically comprises an enumeration process in which the various devices report whether they support the Option-ROM functionality. Since the network adapter is connected to multiple CPUs over multiple respective PCIe interfaces, it is conventionally expected to report its support of Option-ROM separately over each PCIe interface. As a result, the BIOS will present to the user multiple different redundant sets of (one or more) configuration menus for the same network adapter, instead of a single set. Presenting redundant configuration menus is confusing to the user, and may also cause configuration errors, e.g., if the user enters contradicting values in different menus.

In some embodiments of the present invention, the network adapter deliberately refrains from reporting its support of Option-ROM over the multiple PCIe interfaces. Instead, the network adapter reports support of Option-ROM over only a single PCIe interface (selected from among the multiple PCIe interfaces connecting the network adapter to the multi-CPU server). Consequently, the BIOS of the multi-CPU server will correctly present only a single non-redundant set of (one or more) configuration menus for configuring the network adapter.

System Description

Figure 1:
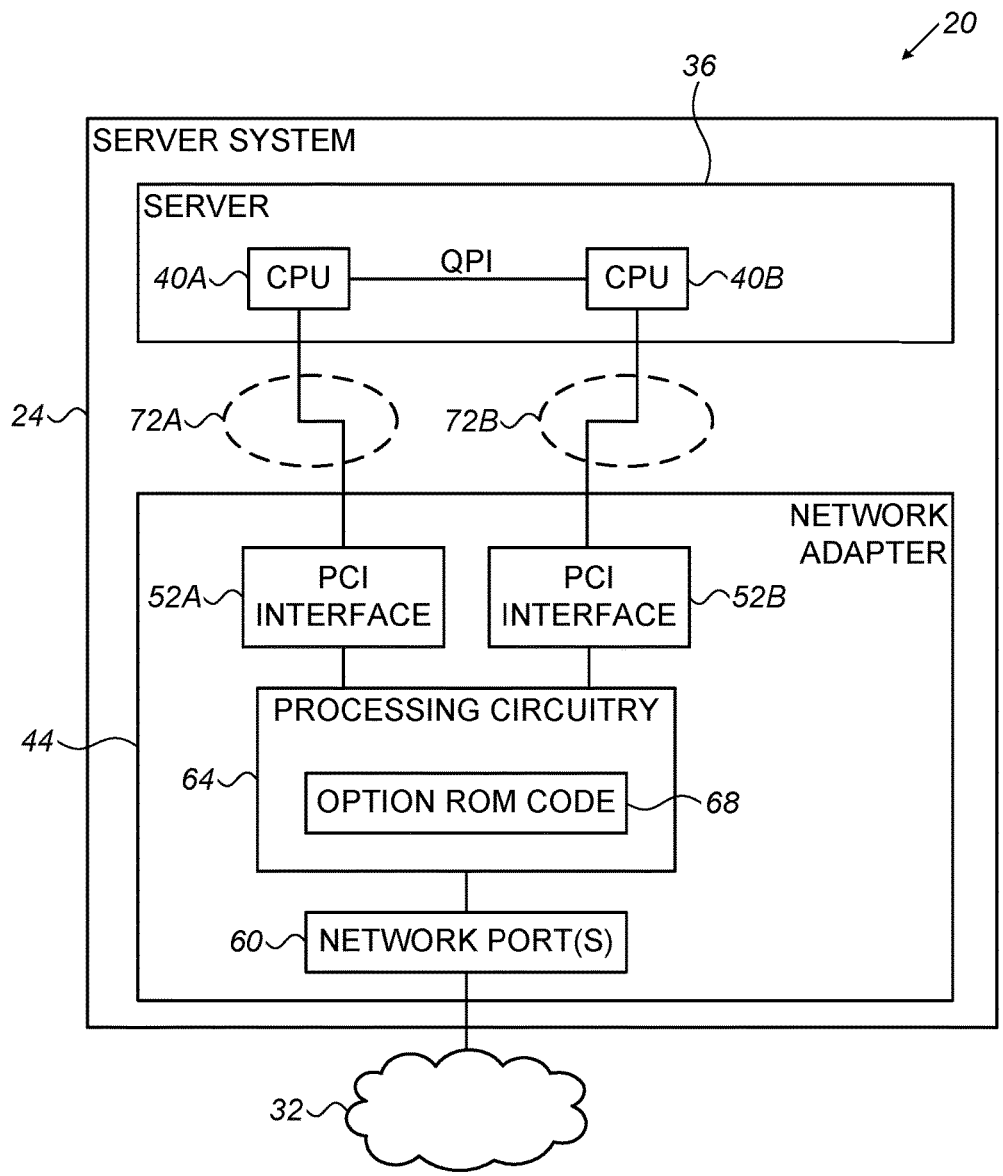
FIG. 1 is a block diagram that schematically illustrates a computing system comprising a multi-CPU server, comprising a "socket-direct" network adapter that supports Option-ROM, in accordance with an embodiment of the present invention.

FIG. 1 is a block diagram that schematically illustrates a computing system 20, in accordance with an embodiment of the present invention. System 20 comprises a server system 24 that communicates with other computers (not shown in the figure) over a communication network 32. System 20 may comprise, for example, a data center, a High-Performance Computing (HPC) computer cluster, or any other suitable type of computing system.

Network 32 may comprise, for example, a Local-Area Network (LAN), a Wide-Area Network (WAN) such as the Internet, or any suitable type of network or combination of networks. Network 32 and server system 24 may operate in accordance with any suitable network protocol, such as InfiniBand or Ethernet. The example of FIG. 1 shows a single server system 24 for the sake of clarity. Real-life systems may comprise multiple server systems 24.

In the embodiment of FIG. 1, server system 24 comprises a multi-CPU server 36 and a network adapter 44. Multi-CPU server 36 comprises multiple Central Processing Units (CPUs) 40. The figure shows two CPUs 40 for the sake of clarity, but in various embodiments multi-CPU server 36 may comprise any suitable number of CPUs 40.

In the present example, multi-CPU server 36 and network adapter 44 are implemented as "Socket-Direct" devices. In such a configuration, network adapter 44 is connected directly to two or more individual CPUs 40, enabling these CPUs to communicate directly over network 32. The CPUs 40 within multi-CPU server 36 are also configured to communicate with one another using a suitable fabric, e.g., a Quick-Path Interconnect (QPI) fabric. For communicating over network 32, however, each CPU 40 typically communicates with network adapter 44 over a respective direct link e.g., a Peripheral Component Interconnect Express (PCIe) link, and not via the QPI fabric. PCIe is specified, for example, by the PCI Special Interest Group (PCI-SIG), in "PCI Express Base Specification Revision 3.1a," Dec. 7, 2015, which is incorporated herein by reference.

Network adapter 44 is typically used for exchanging communication traffic between user applications running on server 36 and other computers or entities (not shown) over network 32. In the disclosed embodiment, network adapter 44 comprises a plurality of PCIe interfaces 52 (in the present example two PCIe interfaces denoted 52A and 52B), one or more network ports 60, and processing circuitry 64 (also referred to as a processor). Each PCIe interface 52 is configured for communicating with a corresponding CPU 40 of multi-CPU server 36 over the corresponding direct links. Ports 60 are configured for communicating with network 32. PCIe interfaces 52 are also referred to as "bus interfaces."

Typically, each PCIe interface 52 of network adapter 44 is connected to its respective CPU 40 via a respective PCIe fabric 72. In the configuration FIG. 1, two separate PCIe fabrics 72A and 72B connect PCIe interfaces 52A and 52B to their respective CPUs.

In an embodiment, processing circuitry 64 comprises an Option-ROM 68. Option-ROM 68 typically comprises a set of program instructions that are stored in on-board non-volatile memory. During the boot process of server 36, CPUs 40 run a Built-In Operating System (BIOS) that loads and executes these program instructions. The instructions of Option-ROM 68 may instruct the BIOS to perform various tasks, for example loading the operating system of server 36 over network 32, configuring the parameters of network adapter 44, or any other suitable task.

The system and server configurations of FIG. 1 are exemplary configurations that are shown purely for the sake of conceptual clarity. Any other suitable system and/or server configuration can be used in alternative embodiments. For example, server system 24 may comprise multiple multi-CPU servers 36 and/or multiple network adapters 44. In an example embodiment, a given server 36 may be connected to two or more network adapters 44. Additionally or alternatively, a given network adapter 44 may serve two or more servers 36. As another example, server system 24 may comprise multiple servers, any of which may comprise a multi-CPU server or a single-CPU server. Generally, not all of CPUs 40 in server system 24 need necessarily be connected directly to network adapter 44. The disclosed techniques are applicable in any such configuration. Depending on the network type, network adapter 44 may also be referred to as a Host Channel Adapter (HCA) or a Network Interface Controller (NIC), for example. Elements that are not necessary for understanding the principles of the disclosed techniques have been omitted from the figure for clarity.

In the exemplary configuration shown in FIG. 1, network adapter 44 is implemented as a board or Integrated Circuit (IC) that is separate from server 36. In alternative embodiments, however, network adapter 44 may be integrated with the hardware of server 36, for example.

The different elements of network adapter 44 may be implemented using any suitable hardware, such as in an Application-Specific Integrated Circuit (ASIC) or Field-Programmable Gate Array (FPGA). In some embodiments, some elements of network adapter 44 can be implemented using software, or using a combination of hardware and software elements.

In some embodiments, some or all of the functionality of CPUs 40 and/or processing circuitry 64 may be implemented using one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Additional aspects of operating socket-direct network adapters in multi-CPU servers are addressed in U.S. patent application Ser. No. 15/701,461, entitled "Remote host management using Socket-Direct network interface controllers," filed Sep. 12, 2017, which are assigned to the assignee of the present patent application and whose disclosure is incorporated herein by reference.

Reporting Option-ROM Support on Only a Single PCIe Interface

As explained above, the capability to communicate directly between network adapter 44 and multiple individual CPUs 40 is problematic from the standpoint of Option-ROM support management. For example, if processing circuitry 44 were to report its support of Option-ROM on each of PCIe interfaces 52 (as conventionally expected), the BIOS of multi-CPU server 36 would present multiple redundant sets of (one or more) configuration menus for configuring network adapter 44. Presenting multiple different sets of configuration menus for the same network adapter 44 is confusing to the user at best. In some cases, presenting multiple different sets of configuration menus may cause configuration errors or other inconsistencies, e.g., when the user enters contradicting information in different menus.

In order to avoid these and other problems, in some embodiments of the present invention network adapter 44 reports Option-ROM support over only one selected PCIe interface 52. In addition, the program instructions in Option ROM 68 typically comprise one or more drivers (e.g., UEFI driver, PXE driver and/or CLP driver) that, once loaded by the server BIOS, further check for Option ROM support on all detected instances of the same part number (in the present example, over all instances of the specific network adapter 44).

Figure 2:
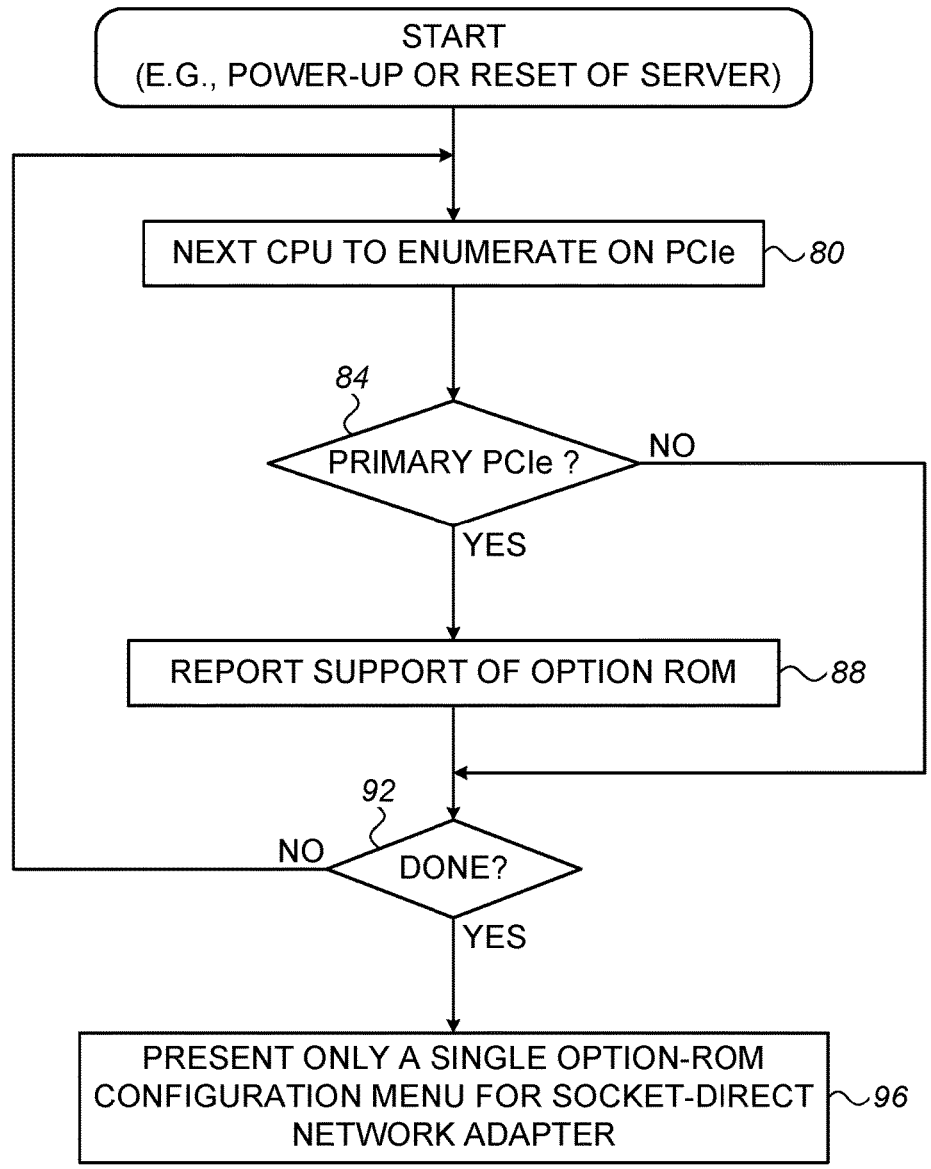
FIG. 2 is a flow chart that schematically illustrates a method for supporting Option-ROM in the multi-CPU server of FIG. 1, in accordance with an embodiment of the present invention.

FIG. 2 is a flow chart that schematically illustrates a method for supporting Option-ROM in multi-CPU server 36, in accordance with an embodiment of the present invention. For clarity, the method description refers to a single multi-CPU server 36 and a single network adapter 44. For multiple multi-CPU servers 36 and/or multiple network adapters 44, the method is typically repeated per server-adapter pair. The method of FIG. 2 may be carried out, for example, upon power-up or reset of server system 24, or of a particular multi-CPU server 36.

The method begins at an enumeration step 80, in which processing circuitry 64 is accessed by a CPU 40 connected to network Adapter 44, to enumerate PCIe interface 52 connected to the currently-enumerating CPU. At a checking step 84, processing circuitry 64 checks whether the PCIe interface 52 of the currently-enumerating CPU 40 is defined as the primary PCIe interface of network adapter 44. The primary PCIe interface is typically defined as the PCIe interface that communicates on the network adapter's PCIe lane 0. Alternatively, any other suitable convention can be used.

If the PCIe interface of the currently-enumerating CPU is indeed the primary PCIe interface, processing circuitry 64 reports to server 36, via this PCIe interface, that network adapter 44 supports Option ROM functionality, at a reporting step 88. This reporting can be performed using any suitable protocol, such as using any of the PXE, UEFI or MS CLP protocols, cited above. If the currently-enumerating CPU 40 is not connected through the primary PCIe interface of network adapter 44, step 88 is skipped.

At a completion checking step 92, processing circuitry 64 checks whether all PCIe interfaces 52 on server 36 have been enumerated. If not, the method loops back to step 80 above. Once all PCIe interfaces 52 connected to network adapter 44 from server 36 are enumerated, the method proceeds to a configuration step 96.

As can be seen from the description above, following the enumeration process of steps 80-92, the BIOS of multi-CPU server 36 is aware of only a single network adapter 44, connected to server 36 using a specific PCIe interface 52 and PCIe fabric 72, from among the multiple PCIe interfaces 52 and fabrics 72. Only this PCIe interface 52 has been reported to server 36 (by processing circuitry 64 of network adapter 44) as supporting Option ROM. In other words, the BIOS is aware of only a single Option-ROM instance, associated with the primary PCIe interface. Thus, at configuration step 96, the BIOS (running on CPUs 40) loads the Option ROM code from network adapter 44 through the primary PCIe interface 52. Once the Option ROM code is executing on multi-CPU server 36, it further checks which of the multiple PCIe interfaces 52 reports support for Option ROM such that it presents to the user only a single, non-redundant set of (one or more) configuration menus for configuring network adapter 44.

Although the embodiments described herein mainly address multi-CPU servers (e.g., server 36 of FIG. 1), the methods and systems described herein can also be used in other applications, such as in other types of multi-CPU or multi-PCIe-bus devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A network adapter, comprising:
one or more network ports configured to communicate with a communication network;

multiple bus interfaces, configured to communicate with multiple respective Central Processing Units (CPUs) that belong to a multi-CPU device; and a processor, configured to:
support an Option-Read-Only-Memory (Option-ROM) functionality, in which the network adapter holds Option-ROM program instructions that are loadable and executable by the multi-CPU device during a boot process;
select a single bus interface from among the multiple bus interfaces that connect the network adapter to the respective CPUs; and
in response to receiving a request from the multi-CPU device to report a support of the Option-ROM functionality, report the support of the Option-ROM functionality over only the single bus interface, though one or more of the bus interfaces, other than the single selected bus interface, support the Option-ROM functionality,
wherein, by reporting the support of the Option-ROM functionality over only the single bus interface, the processor is configured to cause the multi-CPU device to present to a user only a single, non-redundant set of one or more configuration menus for configuring the network adapter.

2. The network adapter according to claim 1, wherein the multiple bus interfaces are configured to communicate with the multi-CPU device over a Peripheral Component Interconnect Express (PCIe) bus.

3. The network adapter according to claim 1, wherein the multi-CPU device comprises a multi-CPU server.

4. The network adapter according to claim 1, wherein the Option-ROM program instructions, when loaded and executed, check which of the multiple bus interfaces reports the support of the Option-ROM functionality, and enable the Option-ROM functionality to the multi-CPU device only over the single bus interface.

5. A method, comprising:
in a network adapter, communicating with a communication network via one or more ports, and communicating via multiple bus interfaces with multiple respective Central Processing Units (CPUs) that belong to a multi-CPU device;
supporting in the network adapter an Option-Read-Only-Memory (Option-ROM) functionality, by holding in the network adapter Option-ROM program instructions that are loadable and executable by the multi-CPU device during a boot process;
selecting a single bus interface from among the multiple bus interfaces that connect the network adapter to the respective CPUs; and
in response to receiving in the network adapter a request from the multi-CPU device to report a support of the Option-ROM functionality, reporting the support of the Option-ROM functionality over only the single bus interface, even though one or more of the bus interfaces, other than the single selected bus interface, support the Option-ROM functionality,
wherein reporting the support of the Option-ROM functionality over only the single bus interface comprises causing the multi-CPU device to present to a user only a single, non-redundant set of one or more configuration menus for configuring the network adapter.

6. The method according to claim 5, wherein communicating via the multiple bus interfaces comprises communicating with the multi-CPU device over a Peripheral Component Interconnect Express (PCIe) bus.

7. The method according to claim 5, wherein the Option-ROM program instructions, when loaded and executed, checks which of the multiple bus interfaces reports the support of the Option-ROM functionality, and enables the Option-ROM functionality to the multi-CPU device only over the single bus interface.

8. The method according to claim 5, wherein the multi-CPU device comprises a multi-CPU server.

9. A computer software product, the product comprising a tangible non-transitory computer-readable medium in which program instructions are stored, which instructions, when read by a processor of a network adapter, cause the processor to:
communicate with a communication network via one or more ports;
communicate via multiple bus interfaces with multiple respective Central Processing Units (CPUs) that belong to a multi-CPU device;
support an Option-ROM functionality, by holding in the network adapter Option-Read-Only-Memory (Option-ROM) program instructions that are loadable and executable by the multi-CPU device during a boot process;
select a single bus interface from among the multiple bus interfaces that connect the network adapter to the respective CPUs; and
in response to receiving from the multi-CPU device a request to report a support of the Option-ROM functionality, report the support of the Option-ROM functionality over only the single bus interface, even though one or more of the bus interfaces, other than the single selected bus interface, support the Option-ROM functionality,
wherein, by reporting the support of the Option-ROM functionality over only the single bus interface, the instructions cause the processor to cause the multi-CPU device to present to a user only a single, non-redundant set of one or more configuration menus for configuring the network adapter.

10. The product according to claim 9, wherein the multiple bus interfaces communicate with the multi-CPU device over a Peripheral Component Interconnect Express (PCIe) bus.

11. The product according to claim 9, wherein the multi-CPU device comprises a multi-CPU server.

12. The product according to claim 9, wherein the Option-ROM program instructions, when loaded and executed, checks which of the multiple bus interfaces reports the support of the Option-ROM functionality, and enables the Option-ROM functionality to the multi-CPU device only over the single bus interface.

* * * * *